United States Patent [19]

McKenna et al.

[11] Patent Number: 4,927,258

[45] Date of Patent: May 22, 1990

[54] EYEGLASS HOLDER

[76] Inventors: Peter L. McKenna, 322 Falls Ct., Woodstock, Ga. 30188; James M. Walters, III, 173 Autumn Ridge Trail, Roswell, Ga. 30076

[21] Appl. No.: 268,793

[22] Filed: Nov. 9, 1988

[51] Int. Cl.5 .................................................. G02C 3/00
[52] U.S. Cl. ..................................... 351/156; 351/157
[58] Field of Search ........................ 351/123, 156, 157; 2/13

[56] References Cited

U.S. PATENT DOCUMENTS 4,783,164  11/1988  Heiberger ........................... 351/156

Primary Examiner—Rodney B. Bovernick
Attorney, Agent, or Firm—Donald A. Kettlestrings

[57] ABSTRACT

An eyeglass holder includes an elongated, flexible, hollow tube for containing a sunscreen or suntan product. Caps are attached to the ends of the tube for removably covering the open ends of the tube, and flexible straps are used to attach the caps to the tube and for receiving and holding earpieces of the eyeglasses whereby the eyeglasses can be suspended from the wearer's neck.

10 Claims, 2 Drawing Sheets

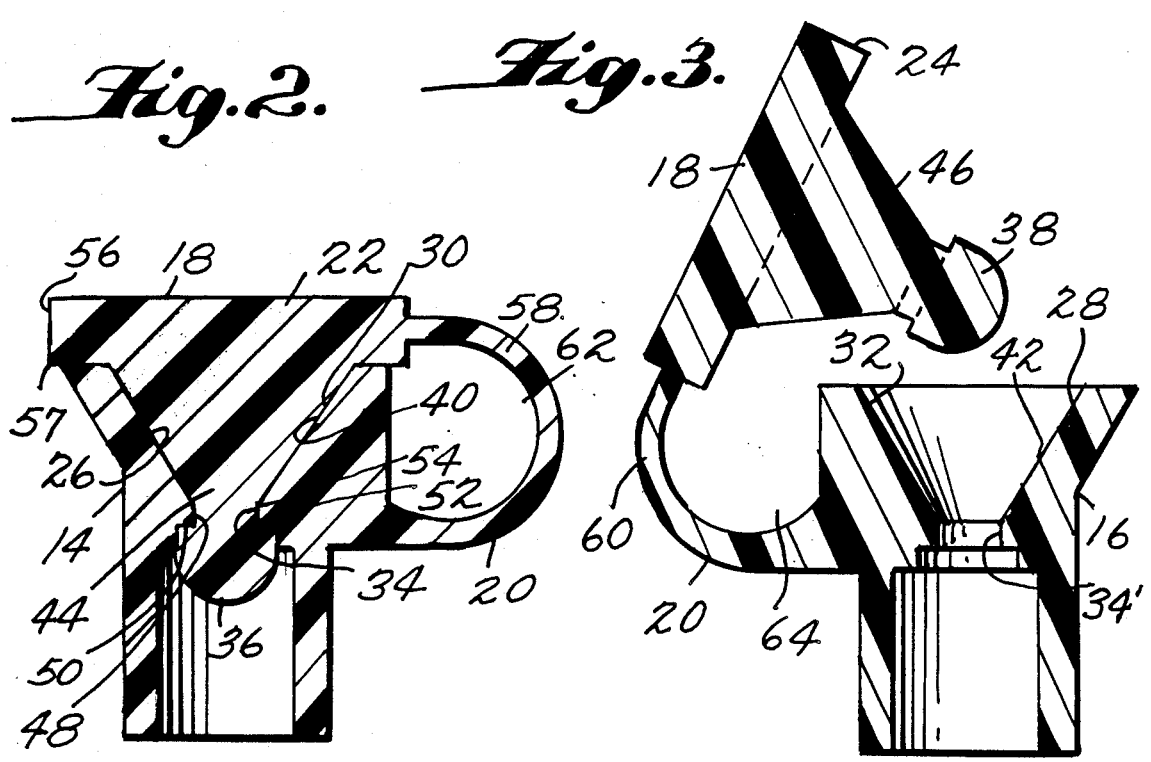
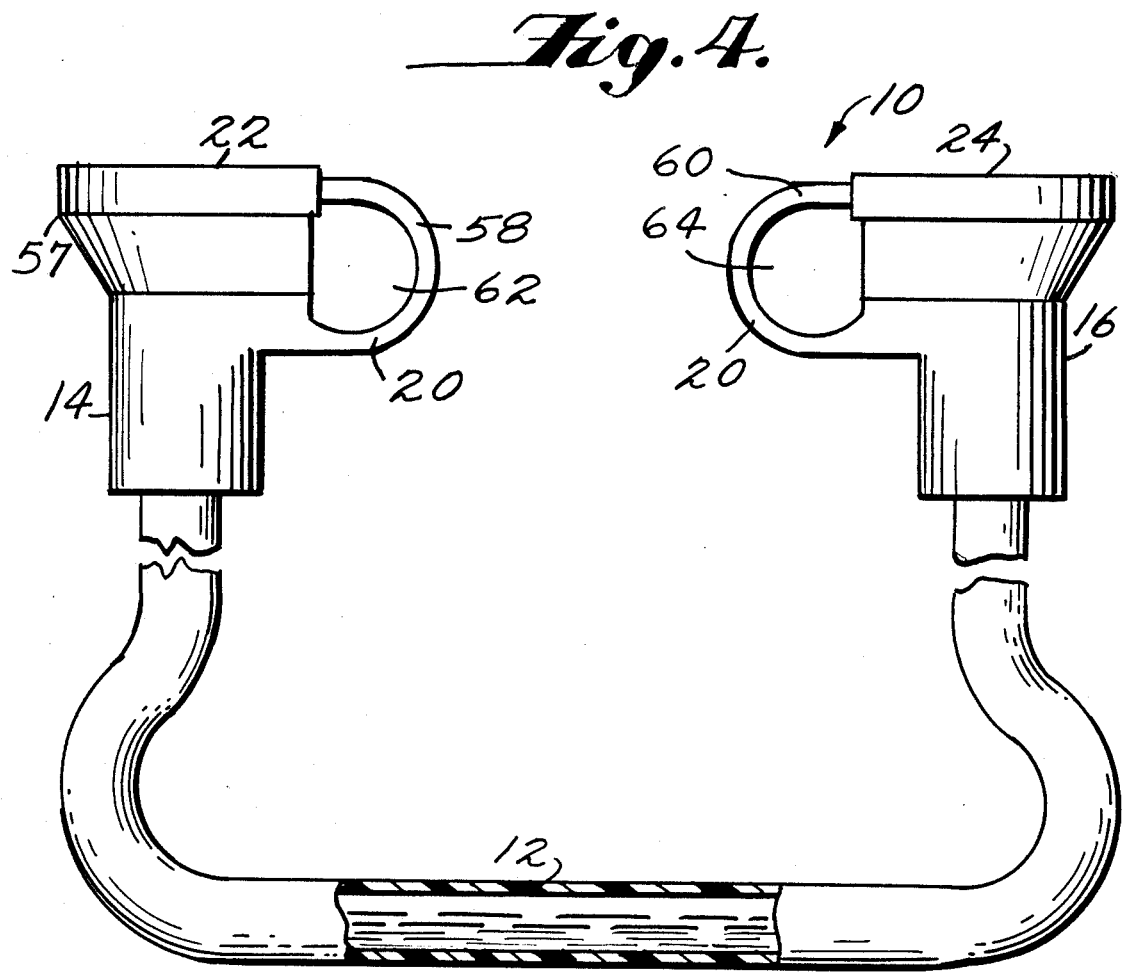

EYEGLASS HOLDER

This invention relates to an eyeglass holder and more particularly to an eyeglass holder which is adapted to contain a sunscreen or suntan product which can be quickly and easily dispensed from the elongated, flexible, hollow tube of the holder.

Eyeglass holders for holding eyeglasses on the head of the wearer or for retaining the eyeglasses suspended from the neck of the wearer are well known. Use of such eyeglass holders also is common when eyeglasses are worn during outdoor activities. Such outdoor activities typically involve exposure to the sun, and it is often desirable for the eyeglass wearer to use a sunscreen or suntan product to protect the wearer's skin from the sun's rays.

It is, therefore, an object of the present invention to provide an eyeglass holder which suspends eyeglasses from the wearer's neck.

Another object is to provide such an eyeglass holder which is adapted to contain a sunscreen or suntan product.

A further object of the invention is the provision of such an eyeglass holder which enables the sunscreen or suntan product to be quickly and easily dispensed from the eyeglass holder.

Still another object is to provide such an eyeglass holder which enables the sunscreen or suntan product to be dispensed by squeezing the flexible, hollow tube of the eyeglass holder which also acts to suspend the eyeglasses from the wearer's neck.

Another object of the invention is to provide such an eyeglass holder which enables the holder to be quickly and conveniently filled or replenished with a sunscreen or suntan product.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides an eyeglass holder comprising: an elongated, flexible, hollow tube defining first and second open ends; means attached to the ends for removably covering the open ends; and means in operative relationship with the tube and with the covering means for attaching the covering means to the tube and for receiving and holding earpieces of the eyeglasses, whereby the eyeglasses can be suspended from the wearer's neck.

It is to be understood that both the foregoing general description and the following detailed description are exemplary and explanatory but are not restrictive of the invention.

The accompanying drawings, which are incorporated in and constitute a part of this specification, illustrate an example of a preferred embodiment of the invention and, together with the description, serve to explain the principals of the invention.

FIG. 2 is a fragmentary view, in section, of one end of the eyeglass holder;

FIG. 3 is a fragmentary view, in section, of the opposite end of the eyeglass holder; and FIG. 4 is a fragmentary front elevation view of the eyeglass holder.

Figure 1:
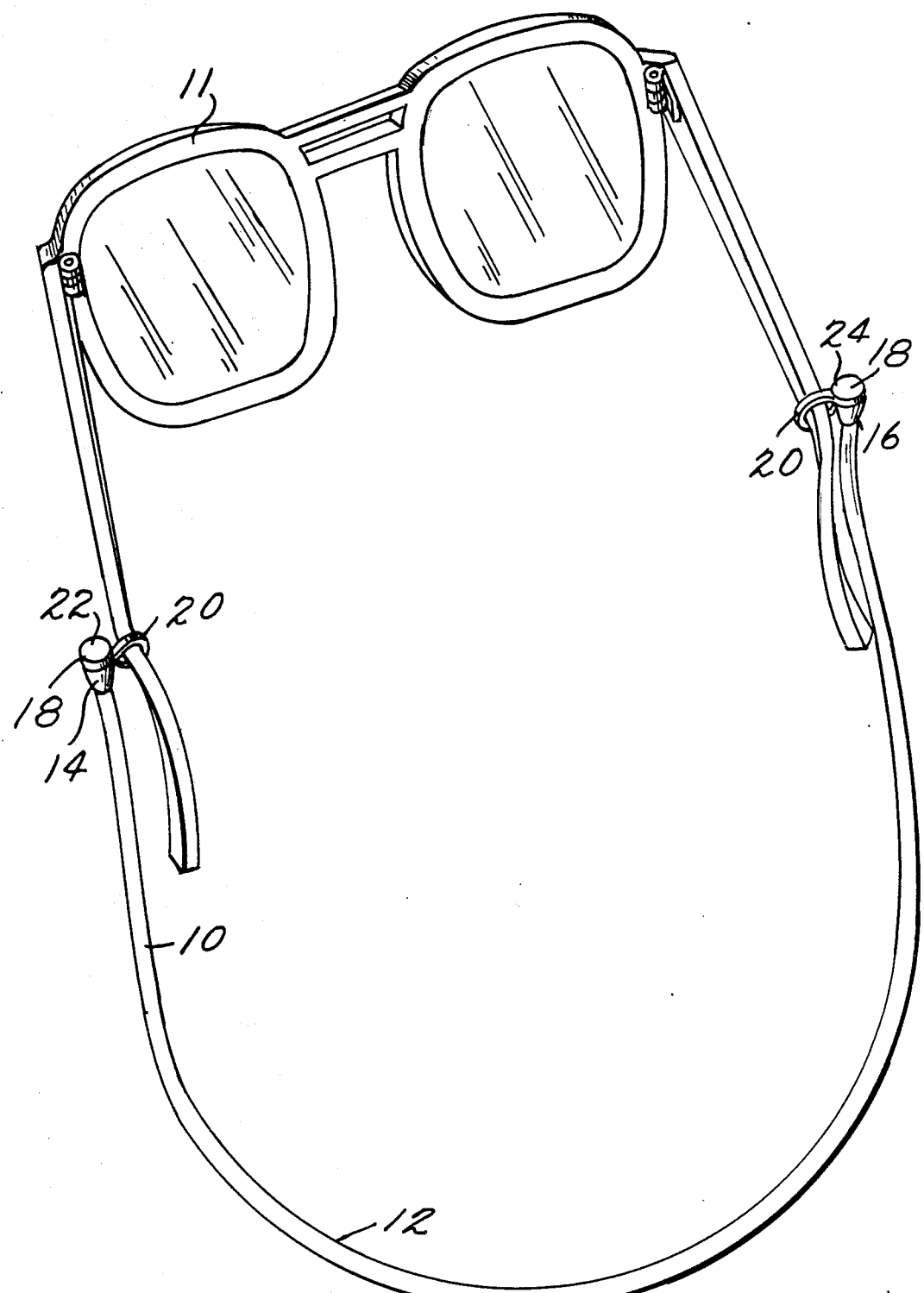
FIG. 1 is a perspective view of the eyeglass holder described herein and showing the holder mounted on a conventional pair of eyeglasses.

With reference now to the drawings, wherein like reference characters designate like or corresponding parts throughout the several views, there is shown an eyeglass holder 10 in accordance with this invention which includes an elongated, flexible, hollow tube 12 that defines first and second ends 14, 16.

Means 18 are attached to at least one of ends 14, 16 for removably covering the end to close the hollow interior of tube 12. Means 20 also are provided in operative relationship with tube 12 for receiving and holding the earpieces of eyeglasses 11 whereby the eyeglasses can be suspended from the wearer's neck.

Preferably, removable covering means 18 are attached to both ends 14, 16 to removably close both ends of the interior of hollow tube 12. However, one end of hollow tube 12 could be permanently closed and the other end of tube 12 could be open. Covering means 18 preferably include first and second caps 22, 24 of predetermined size and shape to removably fit within and close ends 14, 16, respectively, of tube 12.

The interior of hollow tube 12 preferably defines first and second openings 26, 28 at first and second ends 14, 16, respectively, and each of openings 26, 28 preferably defines a wall 30, 32, respectively, which further defines a boss 34, 34', respectively, within each opening. Each of caps 22, 24 defines an enlarged flexible end portion 36, 38, respectively, for releasably engaging and snap-fitting over boss 34, 34', respectively, to releasably hold the caps in position to close openings 26, 28.

Openings 26, 28 each preferably defines a substantially conically shaped interior surface 40, 42, respectively, and each of caps 22, 24 defines a substantially conically shaped male portion 44, 46, respectively, for engaging surfaces 40, 42 when the caps are positioned within openings 26, 28, respectively.

More specifically, bosses 34, 34' are formed in an identical manner by surfaces which are oriented at right angles to each other. For example, boss 34 is formed by surfaces 48, 50 which are oriented at substantially right angles to each other, and end portion 36 of cap 22 is provided with surface 52 substantially at right angles with respect to surface 54. Accordingly, when cap 22, for example, is positioned within opening 26 and with male portion 44 engaging interior surface 40, flexible end portion 36 moves past boss 34 into so-called snap-fitting position with surfaces 50, 52 in engagement with each other and with surfaces 48, 54 in engagement with each other. In this position cap 22 is tightly retained within and seals opening 26.

Removal of cap 22 from opening 26 is accomplished by grasping upper portion 56 of cap 22, which projects beyond tube 12 at 57, and by pulling upwardly. This upward force causes surface 52 of cap 22 to flexibly move away from surface 54 to form an angle of greater than ninety degrees so that surface 52 and end portion 36 of cap 22 are permitted to move upwardly past boss 34 and past boss surface 48.

In accordance with the invention, receiving and holding means 20 preferably include first and second flexible straps 58, 60 which are connected, respectively, between tube 12 and caps 22, 24. Straps 58, 60 define interior openings 62, 64, respectively, of predetermined dimensions for receiving and holding earpieces of the eyeglasses so that the eyeglasses can be suspended from the wearer's neck without the earpieces sliding through openings 62, 64.

In use, one or both of caps 22, 24 are opened and a sunscreen or suntan product, in liquid or paste form, can be poured into the interior of hollow tube 12. Movement of the suntan and/or sunscreen product within hollow tube 12 can be enhanced by squeezing the exterior of tube 12 and by sliding the fingers along the length of the tube to move the product along the interior so that the tube is ultimately filled to the desired capacity. The earpieces of eyeglasses 11 can then be positioned within openings 62, 64, and caps 22, 24 can then be closed into positions within openings 26, 28, respectively. Alternatively, the caps can be closed and the earpieces of eyeglasses 11 can then be inserted through openings 62, 64. Straps 58, 60 and openings 62, 64 are dimensioned so as to firmly grasp and hold the earpieces of the eyeglasses so that the eyeglasses can be suspended from the wearer's neck without the earpieces sliding through openings 62, 64.

If the wearer desires to apply suntan or sunscreen, eyeglasses 11 can be removed and one or both of caps 22, 24 can be opened. The suntan or sunscreen product is then quickly and easily removed from tube 12 by grasping the exterior of tube 12 and by sliding the fingers along the length of the tube to dispense a desired amount of the sunscreen or suntan product through one or both of openings 26, 28. After a sufficient amount of sunscreen or suntan product has been removed from tube 12, the caps are repositioned within openings 26, 28, as previously described.

The conical shape of surfaces 40, 42 enables the suntan or sunscreen product to be quickly and effectively inserted into tube 12. The conical shape provides for a larger opening at the upper portion of ends 14, 16 of tube 12, and it is a simple matter for the user to insert sunscreen or suntan product into openings 26, 28.

Eyeglass holder 10 is preferably comprised of a vinyl plastic. Tube 12 is preferably made approximately two feet in length with an inside diameter of substantially one-eighth inch and an outside diameter of substantially one-quarter inch. Various colors and designs also can be incorporated into tubing 12.

This invention provides for an eyeglass holder which also conveniently permits storage and dispensing of sunscreen or suntan products. The invention in its broader aspects is not limited to the specific details shown and described, and departures may be made from such details without departing from the principles of the invention and without sacrificing its chief advantages.

What is claimed is:

1. An eyeglass holder comprising:
   an elongated, flexible, hollow tube defining first and second ends;
   means attached to at least one of said ends for removably covering said end to close said hollow tube interior;
   means in operative relationship with said tube and with said covering means for receiving and holding earpieces of said eyeglasses, whereby said eyeglasses can be suspended from the wearer's neck;
   said covering means including a first cap of predetermined size and shape to removably fit within and close said first end of said hollow tube;
   said hollow tube interior defining a first opening at said first end, said opening defining a wall having a boss within the opening, and wherein said cap defines an enlarged flexible end portion for releasably engaging and snap-fitting over said boss to releasably hold said cap in position to close said opening.

2. An eyeglass holder as in claim 1 wherein said first opening defines a substantially conically shaped interior surface and wherein said cap defines a substantially conically shaped male portion for engaging the conical surface of said opening when said cap is positioned within said opening.

3. An eyeglass holder as in claim 2 wherein said receiving and holding means includes a first flexible strap connected between said tube and said first cap.

4. An eyeglass holder comprising:
   an elongated, flexible, hollow tube defining first and second open ends;
   means permanently attached adjacent to said ends for removably covering said open ends; and
   means in operative relationship with said tube and with said covering means for permanently attaching said covering means to said tube and for receiving and holding earpieces of said eyeglasses, whereby said eyeglasses can be suspended from the wearer's neck.

5. An eyeglass holder as in claim 4 wherein said covering means include first and second caps of predetermined size and shape to removably fit within and close said first and second open ends, respectively.

6. An eyeglass holder as in claim 5 wherein said first and second open ends define first and second openings, each said opening defining a substantially conically shaped interior surface.

7. An eyeglass holder as in claim 6 wherein each of said interior surfaces of said openings defines a boss within said opening.

8. An eyeglass holder as in claim 7 wherein said caps each defines an enlarged flexible end portion for releasably engaging and snap-fitting over said boss to releasably hold said cap in position to close said opening.

9. An eyeglass holder as in claim 8 wherein each of said caps defines a substantially conically shaped male portion for engaging the conical surface of said opening when said cap is positioned within said opening.

10. An eyeglass holder as in claim 9 wherein said receiving and holding means include first and second flexible straps connected, respectively, between said tube and said first and second caps.

* * * * *